C. J. GUSTAFSON.
FREE ENGINE CLUTCH.
APPLICATION FILED DEC. 9, 1911.
1,207,541.
Patented Dec. 5, 1916.
3 SHEETS—SHEET 1.
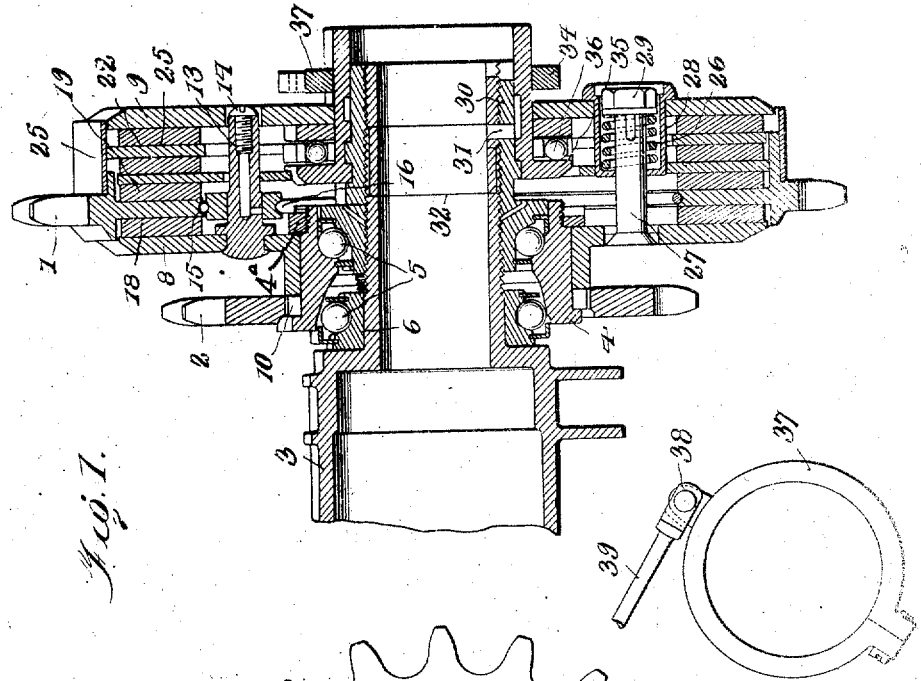
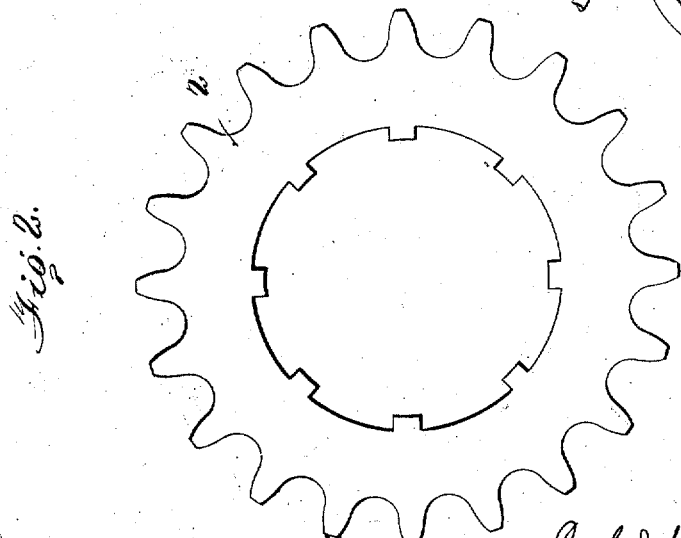

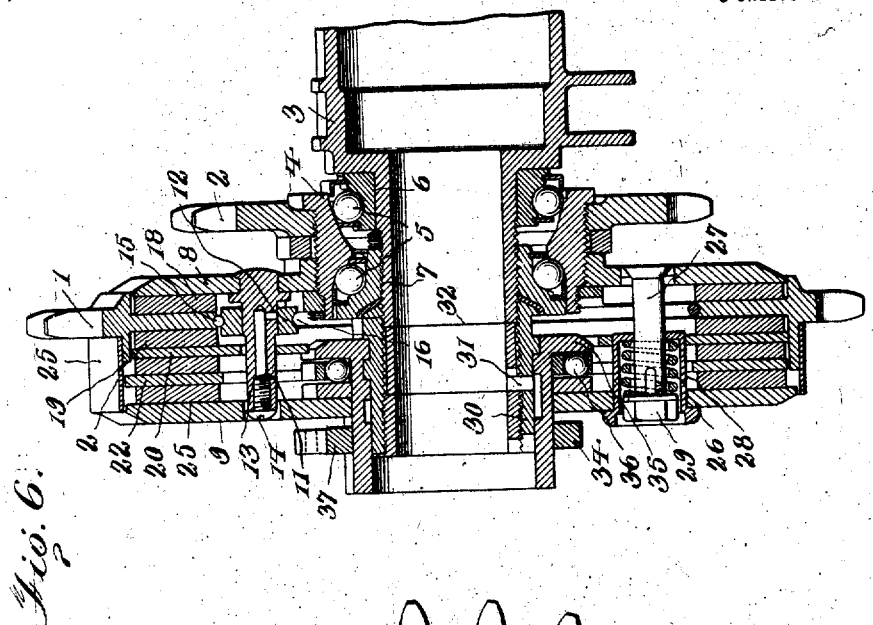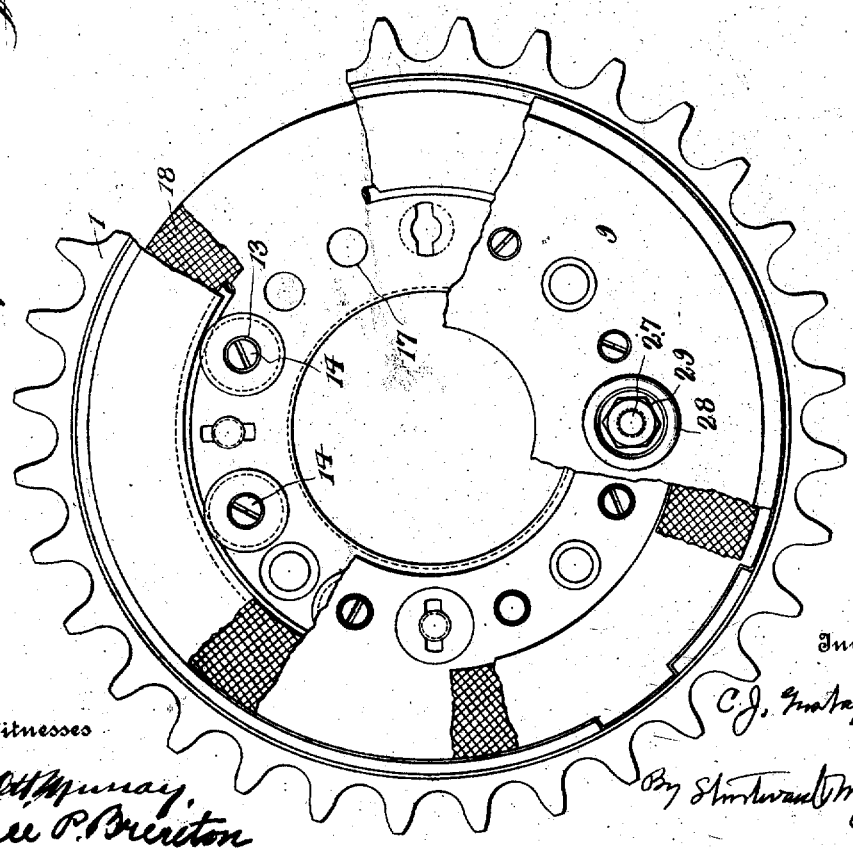

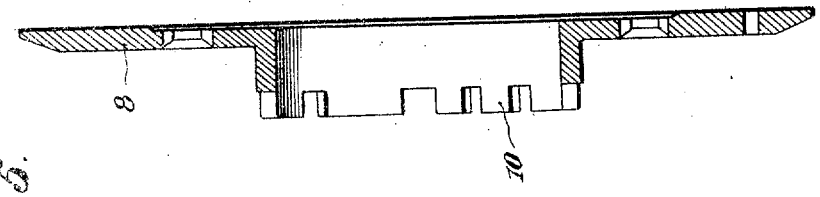
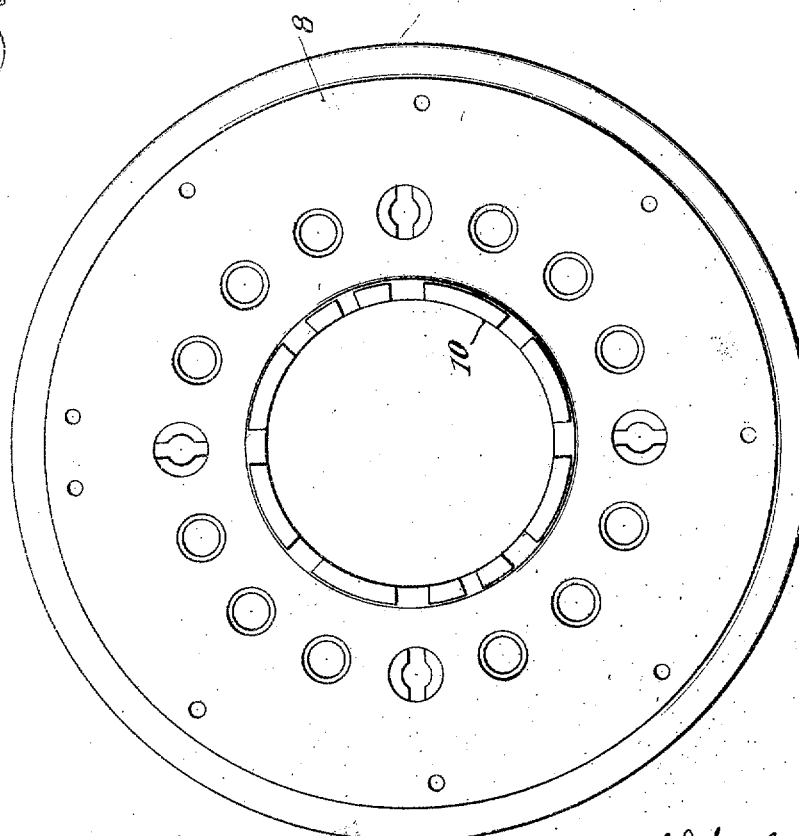

UNITED STATES PATENT OFFICE.

CARL JOHAN GUSTAFSON, OF SPRINGFIELD, MASSACHUSETTS, ASSIGNOR, BY MESNE ASSIGNMENTS, TO HENDEE MANUFACTURING COMPANY, OF SPRINGFIELD, MASSACHUSETTS, A CORPORATION OF MASSACHUSETTS.

FREE-ENGINE CLUTCH.

1,207,541.  Specification of Letters Patent.  Patented Dec. 5, 1916.

Application filed December 9, 1911. Serial No. 664,901.

*To all whom it may concern:*

Be it known that I, CARL JOHAN GUSTAFSON, a subject of the King of Sweden, residing at Springfield, in the county of Hampden, State of Massachusetts, have invented certain new and useful Improvements in Free-Engine Clutches, of which the following is a description, reference being had to the accompanying drawing and to the letters and figures of reference marked thereon.

The invention relates to new and useful improvements in clutches, and more especially to clutches for transmitting power from an engine to a driven part.

An object of the invention is to provide a clutch wherein the engine may run free, or wherein an infinite range of speeds may be obtained from the highest to the lowest balancing speed, when the device is applied to a motorcycle or the like, which clutch is so constructed as to hold to any position in which it may be set, without the aid of any stop or lock.

A further object of the invention is to provide a clutch of the above character, wherein the driving member rides free on roller bearings, and wherein said driving member may be frictionally clutched to the driven member.

These and other objects will in part be obvious, and will in part be hereinafter more fully described.

In the drawings, which show by way of illustration one embodiment of the invention, Figure 1 is a vertical sectional view through the driving and driven members and the clutch and operating parts therefor; Fig. 2 is a face view of one of the driven sprockets; Fig. 3 is a face view of the driving sprocket with the parts broken away to show the inner clutching members; Fig. 4 is a face view of the back gripping plate; Fig. 5 is a sectional view through said plate; and Fig. 6 is a view similar to Fig. 1, showing a slightly modified form of the invention. Fig. 7 is a detail showing the ring for the shifting sleeve.

In the present embodiment of my invention, I have shown the clutch especially adapted for connecting the engine of a motorcycle to the driving wheel thereof. Said clutch consists of a driving member 1, which, as herein shown, is in the form of a sprocket, and this sprocket is adapted to be driven directly from the engine shaft. The clutch also includes a driven member 2, which, as herein shown, is in the form of a sprocket, and this driven member is adapted to be connected directly to the sprocket on the rear wheel of the motorcycle. These sprockets are mounted on the frame 3 of the motorcycle, which may if desired be in the form of a sleeve, so that a crank shaft to which the pedals are attached, may pass through said sleeve. The driven sprocket 2 is threaded on to a sleeve 4, which is mounted on ball bearings 5 coöperating with cone bearings 6 and 7 carried by the frame 3. The cone 7 is threaded on to the frame, and retains the balls in contact with the sleeve 4 in the well known manner.

The driving member 1 is clutched between a back plate 8 and a front clamping plate 9, in a manner which will be hereinafter described. The back plate 8 is formed with a projecting collar 9, which is provided with spaced projections 10, adapted to interlock with similar spaced projections on the hub of the driven sprocket 2. This collar 9 slides freely on the sleeve 4, and by the interlocking projections, is held so as to rotate with the sleeve and driven sprocket 2. The sprockets are held on the sleeve 4 by a threaded ring 4ª and may be locked against rotation relative to the sleeve by interlocking parts.

The clamping plate 8 carries a plurality of roller studs 11, and on each stud is mounted to turn freely, a roller 12. The stud is preferably formed with a central recess 13, and a radial recess leading therefrom, whereby the roller may be oiled, and said recess is closed by a suitable screw 14.

The rollers 12 are located in a plane passing centrally through the driving sprocket. The driving sprocket is formed with an enlarged central opening, and the edge of the sprocket forming the opening, is provided with a groove, into which is sprung a hardened steel wire 15. This hardened steel wire 15 is adapted to engage a groove 16 formed in each roller bearing 12.

By the above construction, the driving sprocket 1 is mounted, so that the same may turn freely on the roller bearings 15, and the hardened steel wire will take any wear which occurs between the roller bearings and the driving sprocket, and this wire can be readily replaced.

The roller studs 11 project into suitable openings formed in the front clamping plate 9. I have also provided a plurality of driving studs 17, which are attached to the back plate 8 and project through suitable openings in the front clamping plate 9. These driving studs and the roller bearing studs serve to connect the front and rear plates 8 and 9, so that said plates will rotate together, but the front plate may be moved laterally relative to the rear plate for clamping the driving sprocket to said plates. Between the driving sprocket 1 and the rear clamping plate 8 is a friction pad 18, preferably made of material known in the trade as "Raybestos". Any other suitable friction material may, however, be used in the place of that herein described. On the other side of the driving sprocket is a similar friction pad 19. Adjacent the friction pad 19 is a disk 20. The disk 20 is provided with suitable openings, through which the driving studs and the roller studs pass, so that the disk 20 will rotate with the clamping plates 8 and 9. The sprocket adjacent its outer end is formed with projecting shoulders, which serve to house the friction pads on each side thereof, and also the clamping disk 20. These shoulders do not interfere with the lateral movement of the sprocket or the clamping disks for engaging the sprocket.

Adjacent the clamping disk 20 is a friction pad 21, and adjacent the friction pad 21 is a second clamping disk 22. This clamping disk 22 is formed at its outer periphery with projecting members 23, which interlock with projecting members 24, carried by a collar 25 attached to the driving sprocket, so that the disk 22 will be locked to and turned with the driving sprocket. Outside of the clamping disk 22 is another friction pad 25, which lies also adjacent the outer clamping plate 9. It will readily be seen that when the clamping plate 9 is forced toward the clamping plate 8, the friction disks and the friction pads will be brought into contact with each other, and into contact with the flange or side faces of the driving sprocket, and said driving sprocket will be locked to the clamping plates 8 and 9, which as above noted, are locked to the driven sprocket 2, and, therefore, the driving sprocket and the driven sprocket will turn together. This interlocking of the driving sprocket to the driven sprocket would, however, only occur when the parts are clamped hard together, or when the retarding power on the driven sprocket is not sufficient to cause a slipping between the friction clutching parts.

It will readily be seen that if the pressure between the friction pads and the clamping disks is less, that a certain slip between the clamping members may occur, and, therefore, the driven member will be caused to turn at a less speed than the driving sprocket. By controlling the pressure exerted against the friction pads and the friction disks, the speed transmitted from the driving sprocket to the driven sprocket may be varied through an infinite range of speed from the full speed of the engine to the lowest balancing speed possible for the motorcycle. Furthermore, by this yielding or friction grip in the clutching parts, the explosions of the engine are transmitted to the driving wheel of the motorcycle without causing excessive vibrations in the parts of the motorcycle.

In order to yieldingly hold the parts of the clutch in contact, I have provided a plurality of springs 26. The back clamping plate 8 is formed with a plurality of openings in which are inserted the bolts 27. The front gripping plate 9 is formed with an enlarged opening, in which is seated a sleeve 28. This sleeve 28 is closed at its inner face, except for an opening of sufficient size to allow the bolt 27 to pass through into the sleeve. The spring 26 is housed in the sleeve 28, and rests against the inner end thereof. A nut 29 is threaded on the outer end of the bolt 27, and rests against the other end of the spring 26. By adjusting the nut, the tension of the spring may be varied. This spring bearing against the sleeve which is fast to the front clamping plate, will tend to force said clamping plate toward the rear clamping plate 8. By using a plurality of springs, I am able to produce a sufficiently yielding grip between the clamping members of the clutch, so as to cause the driving sprocket to be brought into driving connection with the driven sprocket.

In order that varying speeds may be secured from the clutch, I have provided means for releasing the clamping action of the springs 26. As herein shown, the frame 3 carries a threaded collar 30, which may be locked on to the frame by a pin 31. Said collar on its outer face is formed with a thread 32. A sleeve 34 is formed on its inner face with a thread which coöperates with the thread 32 on the collar 30. The collar 30 is rigidly held to the frame and by turning the sleeve 34 on the collar, the thread is so constructed as to cause the sleeve 34 to move endwise relative to the frame 3. At its inner end, said sleeve is formed with a flange 35. The outer clamping plate 9 freely engages the outer face of the sleeve 34. Ball bearings 36 are placed between the flange 35 and the inner face of the outer clamping plate 9. When the sleeve is moved outward on the frame 3, the outer clamping plate 9 will be moved away from the inner clamping plate 8, and the springs 26 compressed. This outward movement of the clamping plate 9 will release the parts, either so that the driving sprocket may be run free, or may have a certain slip relative to the driven sprocket, and thereby the various speeds above referred to may be secured.

As a means for rotating the sleeve 34 to control the clutch, I have provided said sleeve with a ring 37, which is clamped to the sleeve. This ring is formed with a projecting lug 38, to which is attached a rod 39, which may be moved by the rider when said clutch is applied to a motorcycle.

By the shifting of the sleeve 34, the clutch may be properly adjusted, so as to secure the desired speeds.

The thread between the sleeve 34 and the collar 30 is of such pitch that when the sleeve is adjusted to any desired position, it will remain in this position until again shifted by the operator.

From the above description, it will be apparent that I have provided a free engine clutch which takes up comparatively little room, which clutch is also adapted to give various speeds for a free engine when desired; and that said clutch may be manipulated by the rider.

While I have described the clutch as especially adapted for a motorcycle, it will be obvious that it may be used in other connections, and it will also be obvious that instead of using sprockets, driving and driven members of other types may be substituted for these sprockets, without departing from the spirit of the invention as set forth in the appended claims.

Having thus described my invention, what I claim as new and desire to secure by Letters Patent, is:—

1. The combination with a driving member and a driven member, of means for frictionally connecting said members including clamping plates on one member, the other of said members having a part extending between the clamping plates, roller studs carried by one of the clamping plates, roller bearings mounted on said studs, the part of said member extending between the clamping plates being adapted to engage said roller bearings, springs for moving one of the plates toward the other, and means for separating the plates.

2. The combination with a driving member and a driven member, of means for frictionally connecting said members including clamping plates on one member, the other of said members having a part extending between the clamping plates, said part at its inner face having a groove formed therein, a hardened steel wire seated in said groove, roller bearings adapted to engage said hardened steel wire for supporting said parts, and means for moving one of said clamping plates toward and from the other to grip and release the part between the same.

3. The combination with a driving member and a driven member, of means for frictionally connecting said members including clamping plates on one member, the other of said members having a part extending between the clamping plates, said part at its inner face having a groove formed therein, a hardened steel wire seated in said groove, roller bearings adapted to engage said hardened steel wire for supporting said part, springs for moving one of said clamping plates toward the other, and means for separating the plates.

4. The combination with a driving member and a driven member, of means for frictionally connecting said members including clamping plates on one member, the other of said members having a part extending between the clamping plates, said part at its inner face having a groove formed therein, a hardened steel wire seated in said groove, roller bearings adapted to engage said hardened steel wire for supporting said part, springs for moving one of said clamping plates toward the other, a sleeve for separating said plates, said sleeve having a thread and a member coöperating with the threaded sleeve for moving the sleeve endwise when said sleeve is turned.

5. The combination with a driving member and a driven member, of means for frictionally connecting said members including clamping plates on one member, the other of said members having a part extending between the clamping plates, said part at its inner face having a groove formed therein, a hardened steel wire seated in said groove, roller bearings adapted to engage said hardened steel wire for supporting said part, springs for moving one of said clamping plates toward the other, a sleeve for separating said plates, said sleeve having a thread and a member coöperating with the threaded sleeve for moving the sleeve endwise when said sleeve is turned, said thread being so constructed as to hold the sleeve in various adjusted positions.

6. The combination of a support, a sleeve rotatably mounted on said support, ball bearings between the sleeve and the support, a sprocket wheel fixed to the sleeve and driven thereby, clamping plates carried by the sleeve and rotating therewith, one of said clamping plates being movable endwise of the sleeve, a driving sprocket having an inwardly projecting member located between the clamping plates, anti-friction rollers carried by one of said clamping plates for said driving sprocket, springs for moving said clamping plate longitudinally of the sleeve for clamping the driving sprocket to the sleeve, and means for moving said clamping plate to release the driving sprocket.

7. The combination of a driving sprocket and a driven sprocket, a clamping plate connected to said driven sprocket, said driving sprocket having an inwardly projecting part, an outer clamping plate, friction members between said clamping plates and the inner projecting part of the driving sprocket, roller bearings for supporting said driving sprocket, means for moving one of said plates toward and from the other, said inner projecting part having a groove formed therein, and a hardened steel wire adapted to be sprung into said groove, said roller bearings having grooves formed therein adapted to receive said hardened steel wire.

8. The combination of a driving sprocket and a driven sprocket, a clamping plate connected to said driven sprocket, said driving sprocket having an inwardly projecting part, an outer clamping plate, friction members between said clamping plates and the inner projecting part of the driving sprocket, roller bearings for supporting said driving sprocket, springs for moving the plates toward each other, and a sleeve having a thread thereon for separating the plates, said inwardly projecting part having a groove formed therein, and a hardened steel wire adapted to be sprung into said groove, said roller bearings having grooves formed therein adapted to receive said hardened steel wire.

9. The combination of a driving sprocket and a driven sprocket, a supporting frame, a sleeve mounted on ball bearings on said frame, the driven sprocket being threaded to said sleeve, a clamping plate loose on said sleeve and having interlocking projections for connecting the same to said driven sprocket, roller studs carried by said clamping plates, roller bearings mounted on said studs, means whereby said driving sprocket is mounted on said roller studs, driving studs carried by said clamping plates, an outer clamping plate engaging said roller studs and said driving studs, said outer clamping plate being movable laterally relative to the inner clamping plate, friction disks between said clamping plates for engaging the driving sprocket, springs for moving the outer clamping plate toward said inner clamping plate, a sleeve having a thread formed thereon for engaging a thread on a collar carried by the frame, means for turning the sleeve, ball bearings between the sleeve and the outer clamping plate, whereby when said sleeve is turned in one direction, the outer clamping plate is moved away from the inner clamping plate and the driving sprocket allowed to run free on the supporting roller bearings.

In testimony whereof I affix my signature in presence of two witnesses.

CARL JOHAN GUSTAFSON.

Witnesses:
 JOHN T. CRONIN,
 J. H. O'BRIEN.